Jan. 1, 1952  E. H. BECCARD  2,580,721
POWER SHAFT ATTACHMENT FOR TRACTORS
Filed Sept. 6, 1950  3 Sheets-Sheet 1
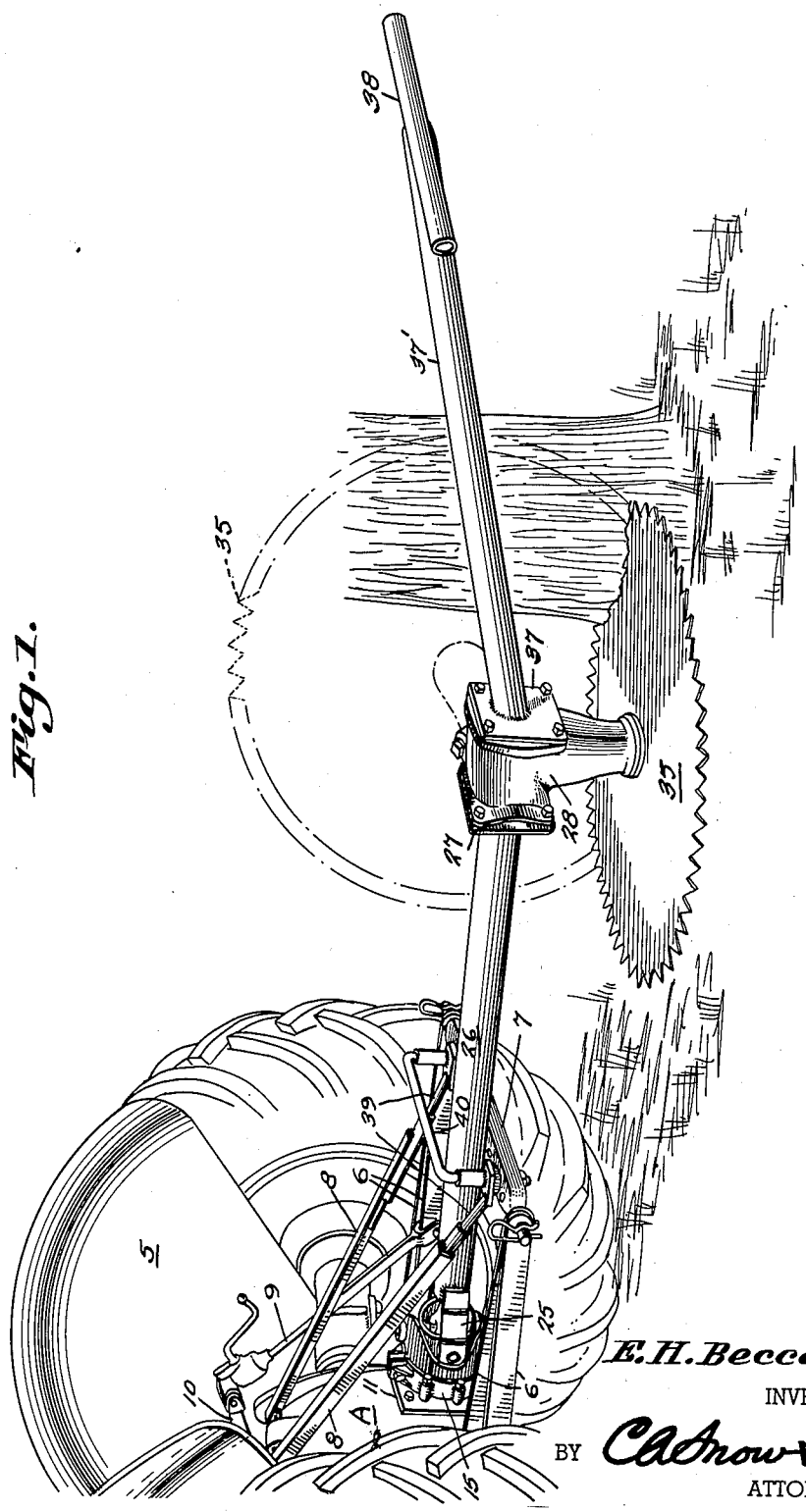
E. H. Beccard
INVENTOR
BY C. A. Snow & Co.
ATTORNEYS.

Jan. 1, 1952 E. H. BECCARD 2,580,721
POWER SHAFT ATTACHMENT FOR TRACTORS
Filed Sept. 6, 1950 3 Sheets-Sheet 2
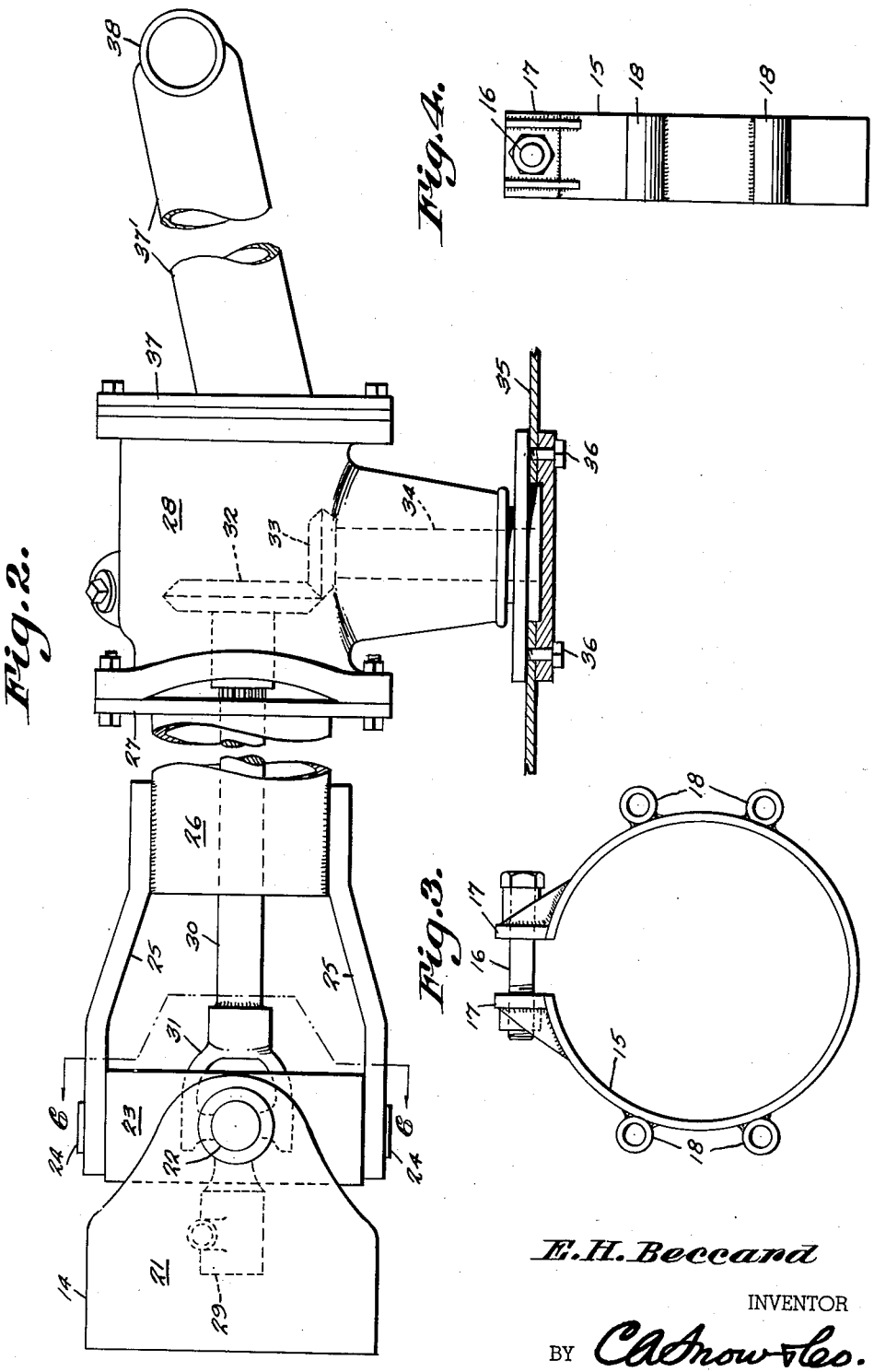
E. H. Beccard
INVENTOR
BY C.A.Snow & Co.
ATTORNEYS.

Jan. 1, 1952  E. H. BECCARD  2,580,721
POWER SHAFT ATTACHMENT FOR TRACTORS
Filed Sept. 6, 1950  3 Sheets-Sheet 3
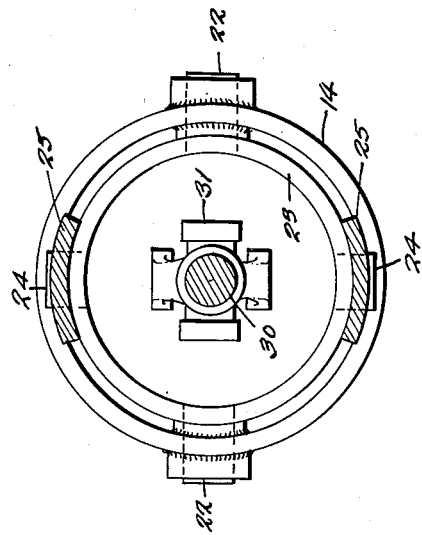
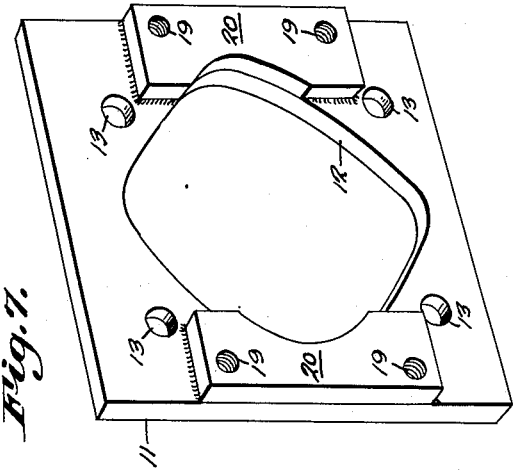
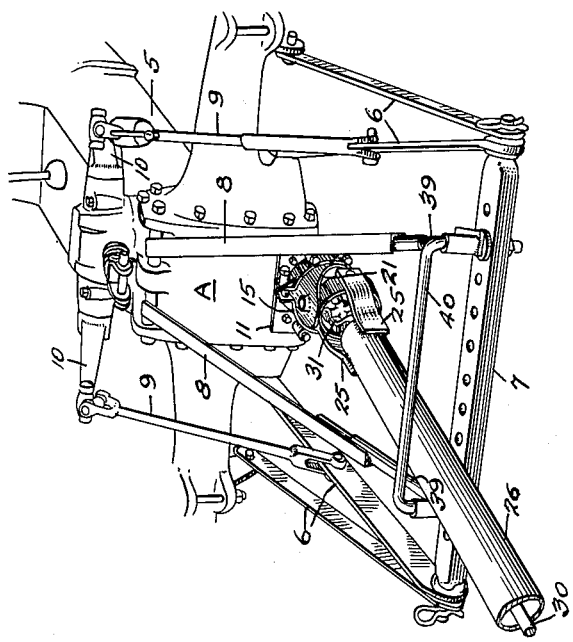
E. H. Beccard
INVENTOR Patented Jan. 1, 1952

2,580,721

UNITED STATES PATENT OFFICE 2,580,721

POWER SHAFT ATTACHMENT FOR TRACTORS

Eldon H. Beccard, Nebraska City, Nebr.

Application September 6, 1950, Serial No. 183,357

1 Claim. (Cl. 143—43)

This invention relates to a power shaft attachment for tractors, and aims to provide a power saw which may be readily and easily attached to a tractor utilizing power from the usual power take-off shaft of a tractor, to operate the saw, the attachment being so constructed and arranged that the saw may be adjusted for operating in a horizontal position for tree falling, brush and hedge trimming, or the saw may be operated in a vertical plane for log bucking.

Another object of the invention is to provide an adjustable clamp providing a locking means for adjusting the attachment with the saw in either a vertical or horizontal position, and when properly adjusted, the torque on the housing will be stabilized, while the attachment still maintains complete flexibility in any direction.

Still another object of the invention is to provide a guide limiting horizontal movement of the attachment supported on the drawbar, and to provide special control bars for support and for limitation of the vertical movement of the attachment.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is a perspective view illustrating an attachment constructed in accordance with the invention as mounted on a tractor and illustrating the position of the saw disc in falling a tree.

Fig. 2 is an enlarged plan view of the attachment.

Fig. 3 is an elevational view of the bolt attachment clamp.

Fig. 4 is an edge elevational view thereof.

Fig. 5 is a perspective view looking at one end of the tractor equipped with the attachment.

Fig. 6 is a sectional view taken on line 6—6 of Fig. 2.

Fig. 7 is a perspective view of the connecting plate used in connection with the power take-off shaft of the tractor.

Referring to the drawings in detail, the reference character 5 indicates a tractor of a conventional structure, which is provided with the usual power take-off shaft that extends rearwardly from the tractor, through an opening in the tractor casing, shown at A.

Mounted at the rear of the tractor, is a supporting frame embodying side members 6, connected at their outer ends by means of the bar 7 which is pivotally connected between the side members 6. Elevating control bars 8 connect the bar 7 and extend to a point adjacent to the rear of the tractor to limit the degree to which the vertically adjustable frame can be lifted.

Connected with the frame 6 are the arms 9 that extend forwardly where they connect with the lifting arm 10 of the tractor, whereby movement of the lifting arm 10 will raise or lower the frame.

The attachment includes the plate 11 which is formed with an opening 12, the plate 11 having openings 13 through which securing bolts or screws may be extended to secure the plate directly over the opening in the tractor casing through which the usual power take-off shaft of the tractor extends.

The reference character 14 indicates the universal joint section which is fitted in the opening 12 and which is held in place by means of the adjustable clamp 15 which is in the form of a split band which is tightened around the universal joint section by means of the bolt 16, which passes through ears 17 formed at the ends of the split band.

Tubular guides 18 are formed on the adjustable clamp 15 and these guides align with the threaded openings 19 formed in the blocks 20 that are mounted on the outer side of the plate 11. Thus it will be seen that when bolts are positioned in the aligning openings 19 and tubular guides 18, the universal joint section 14 will be held stationary.

The section 14 has extensions formed with bearing openings in which the bearings 22 of the swivel ring 23 operate, the swivel ring 23 having bearings 24 extending laterally therefrom, which bearings extend into bearing openings formed in the arms 25 to which the tubular shaft housing is secured at one of its ends. The torque tube 26 connects with the plate 27 to which the gear housing 28 is connected.

The reference character 29 indicates a socket member which is fitted over one end of the power take-off shaft of the tractor with which the attachment is used, the socket member being splined on the shaft and secured against rotation with respect to the shaft.

This socket member 29 has connection with the power shaft 30, through the universal coupling 31, the shaft 30 extending into the gear housing 28 where it is supplied with the pinion 32 that meshes with the pinion 33 of the shaft 34. The shaft 34 extends through one side of the housing 28 and provides a support for the saw 35 which is shown as bolted thereto by means of the bolts 36.

Secured to one end of the housing 28 by means of the plate 37, is the bar 37' to which the handle 38 is connected so that the operation of the saw may be controlled by the operator manipulating the bar 37' by the handle 38.

When the device is to be used in falling trees, it is adjusted so that the saw blade 35 operates in a horizontal plane, as shown by Fig. 1. However, when it is desired to use the saw for buck sawing the handle is rotated to cause the saw disc to operate in a vertical plane, the take-off mechanism operating the power shaft and saw as described.

It might be further stated that the elevation control bars 8 are provided with telescoping sections 39 to limit the upward movement of the attachment for the protection of the tractor, the operator and the attachment.

Forming a part of the supporting frame is an inverted U-shaped guide 40 under which the torque tube 26 operates the member 40 holding the torque tube 26 against vertical movement, but allowing lateral pivotal movement of the torque tube, to a limited degree.

From the foregoing it is believed that the construction and operation of applicant's portable power saw will be obvious and that further description of the operation of the structure is unnecessary.

I claim:

A sawing machine attachment for a tractor having a power take-off shaft and power operated lifting mechanism, comprising a vertically swinging frame operated by said power operated lift, a torque tube, a plate secured to the tractor having an opening through which the power take-off shaft of the tractor extends, blocks having threaded openings secured to the plate, an adjustable coupling band having tubular guides secured to the outer surface thereof aligning with the threaded openings of the blocks, bolts disposed within the aligning openings securing the coupling band to the plate, said coupling band embracing a universal joint section, said universal joint section connecting said torque tube to the tractor, said torque tube resting on the vertically swinging frame, a gear housing secured to one end of the torque tube, a saw shaft having a saw secured thereon, extending into the housing, gearing in the housing through which said saw shaft is rotated, and a handle secured to the gear housing by means of which the gear housing and saw are operated.

ELDON H. BECCARD.

REFERENCES CITED

The following references are of record in the file of this patent:

UNITED STATES PATENTS

| Number | Name | Date |
|---|---|---|
| 1,447,606 | Seymour | Mar. 6, 1923 |
| 2,105,030 | Dunham | Jan. 11, 1934 |
| 2,435,192 | Arsneau | Feb. 3, 1948 |
| 2,462,314 | Fuqua | Feb. 22, 1949 |
| 2,560,641 | Goodlet | July 17, 1951 |